United States Patent [19]

Rabii

[11] Patent Number: 5,016,103

[45] Date of Patent: May 14, 1991

[54] SPATIAL SCAN CONVERTER WITH VERTICAL DETAIL ENHANCEMENT

[75] Inventor: Khosro M. Rabii, Arlington Heights, Ill.

[73] Assignee: Zenith Electronics Corporation, Glenview, Ill.

[21] Appl. No.: 395,006

[22] Filed: Aug. 17, 1989

[51] Int. Cl.$^5$ ............................................... H04N 5/14
[52] U.S. Cl. ..................................... 358/166; 358/11; 358/37; 358/140.
[58] Field of Search .................. 358/140, 166, 167, 37

[56] References Cited

U.S. PATENT DOCUMENTS

| | | | |
|---|---|---|---|
| 4,558,347 | 12/1985 | Pritchard et al. | 358/11 |
| 4,698,673 | 10/1987 | Johnson | 358/166 X |
| 4,809,069 | 2/1989 | Meyer et al. | 358/166 |

*Primary Examiner*—Victor R. Kostak

[57] ABSTRACT

A scan arrangement supplies real line video pixel information to an input demultiplexer that samples the pixels at a frequency of 4fc (fc=color subcarrier) and sequentially writes the sampled information in a series of line memories at an H (horizontal frequency) rate. A plurality of output multiplexers read information from the line memories at a 2H rate and supply it to a video interpolator where interpolated lines are produced based upon immediately adjacent real lines. The video output is at a 2H rate and consists of alternate real and interpolated lines in two successive fields. A vertical detail enhancement circuit combines pixel data from each set of three successive lines (upper (u), lower (l) and middle (m) lines) in accordance with the formula $2m-(u+l)$, to develop a vertical detail component.

8 Claims, 6 Drawing Sheets

FIELD 1

FIELD 2

| | | INPUT L | VD | OUTPUT L |
|---|---|---|---|---|
| A | ——— n + 4 ——— | 0 | | 0 |
| (A+B)/2 | --- n + 5 --- | 0 | | 0 |
| B | ——— n + 6 ——— | 0 | −5 | −5 |
| (B+C)/2 | --- n + 7 --- | 2.5 | | 2.5 |
| C | ——— n + 8 ——— | 5 | 0 | 5 |
| (C+D)/2 | --- n + 9 --- | 7.5 | | 7.5 |
| D | ——— n + 10 ——— | 10 | 0 | 10 |
| (D+E)/2 | --- n + 11 --- | 12.5 | | 12.5 |
| E | ——— n + 12 ——— | 15 | 0 | 15 |
| (E+F)/2 | --- n + 13 --- | 17.5 | | 17.5 |
| F | ——— n + 14 ——— | 20 | +5 | 20 |
| (F+G)/2 | --- n + 15 --- | 20 | | 20 |
| G | ——— n + 16 ——— | 20 | 0 | 20 |
| | --- n + 17 --- | 20 | | 20 |
| | ——— n + 18 ——— | 20 | | 20 |

SPATIAL SCAN CONVERTER WITH VERTICAL DETAIL ENHANCEMENT

BACKGROUND OF THE INVENTION AND PRIOR ART

This invention relates generally to video display systems and specifically to a technique for enhancing the viewability of an interlaced video line scanning system.

In a conventional 525 line television signal scanning system, two successive fields are scanned, each comprising 262½ horizontal lines that are interlaced with each other. The resultant display, produces a visible line structure since each line is scanned only once in every two fields and therefore is black one-half of the time in every frame interval (=1/29.97 sec). Large area flicker is not normally visible however because of the nominal 60 Hz vertical repetition rate. Techniques have been considered in the prior art for overcoming the visible line structure referred to as "static" raster. This line structure is exacerbated in larger viewing screen sizes, and in large screen projection television systems, is often objectionable. Some systems contemplate double scanning, that is repeating a line to effectively create "fill-in" lines to take the place of the blank (black) lines in successive fields. While the field structure is still interlaced with respect to the real video lines, the actual number of lines scanned in each field is doubled with a corresponding improvement in the video display.

The present invention interpolates between the real lines of video information to develop interpolated lines of video that are based upon the real lines. In the simplest environment the interpolated line is one-half the sum of the immediately adjacent real lines, i.e. those on either side of the interpolated line. The present invention further adds peaking or enhancement to emphasize vertical transitions between successive lines of video in the signal. In the preferred implementation of the invention the video information is in a pix 1 format with the pixels being sampled at four times the color subcarrier frequency (4 fc). Corresponding samples from the real lines are processed to develop the interpolated lines of the video and vertical enhancement is performed on real lines only and in a symmetrical manner.

OBJECTS OF THE INVENTION

A general object of the invention is to provide a novel video display arrangement and method; and Another object of the invention is to provide a line display system with vertical detail enhancement and a method therefor.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1A:
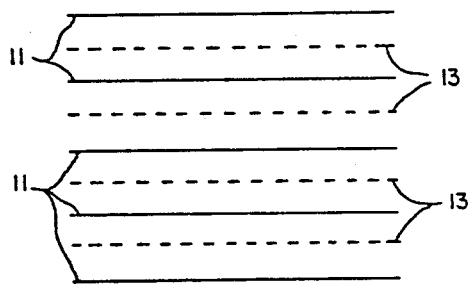
FIGS. 1A and 1B are a partial illustration of two successive fields of an interlaced scan system constructed in accordance with the invention.
Figure 1B:
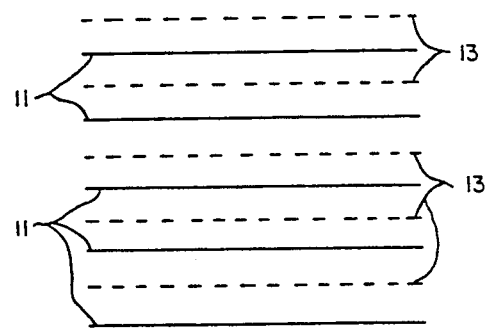

In FIG. 1A and 1B, respectively, two successive fields of line scanned real video information, identified as field #1 and field #2, are shown. The real video lines, that is the lines corresponding to the actual video signal, are labelled 11 and the interpolated video lines are labelled 13. As can be seen, during field #1 the real video lines 11 are interspersed with the interpolated video lines 13. In field #2, the interpolated video lines 13 fall on the corresponding real lines 11 of field #1 and vice versa. The result is that in the display (not shown), each field will consist of real lines 11 and corresponding interpolated lines 13 that overlie each other. With that arrangement, no line will be blank (black) during any field and the interlace line structure or static raster will not exist. In a conventional 525 line system, each field consists of 262½ lines. After processing in accordance with the invention, each field will contain 525 lines with each line being a real line in one field and an interpolated line in the other field. To support that arrangement, the horizontal scanning rate is doubled from the normal 15.75 KHz (1 H) to 31.5 KHz (2 H).

Figure 2:
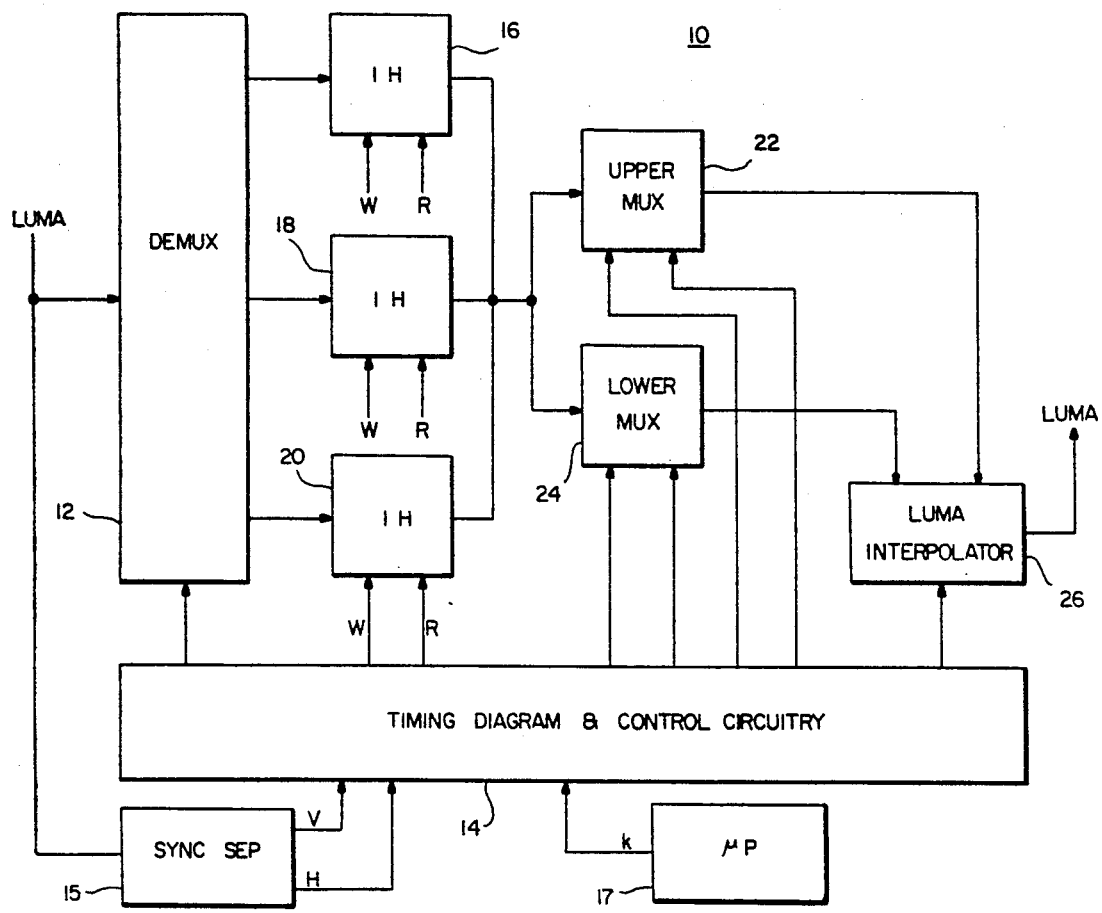
FIG. 2 is a functional block diagram of a line doubler and video interpolator arrangement constructed in accordance with the invention.

The FIG. 2 (and FIG. 3 for chroma) implementation shows a luma input signal being supplied to a demultiplexer 12 that in turn is coupled to three 1 H memories 16, 18 and 20, respectively. The luma signal is also supplied to a sync separator 15 that supplies horizontal (H) and vertical signals (V) to a timing and control circuit 14. Timing and control circuit 14 supplies appropriate read, write and clock signals as well as select signals to the multiplexers to the various blocks as indicated. As will be seen the read signal is twice the frequency of the write signal. In the preferred embodiment the luma signal is in pixel form with eight digital bits defining the pixel value. Line doubler circuit 10 is supplied with luma input information at a 1 H rate and develops luma output information at a 2 H rate. The pixel sample frequency is selected to be four times the frequency of the color subcarrier, i.e. 4 fc. The luma information is written into the respective line memories at a 4 fc rate and read out of the line memories at an 8 fc rate, in response to appropriate signals from timing and control circuit 14. Demultiplexer 12 supplies the successive lines of video pixel information or data to the line memories 16, 18 and 20 in sequence, with one line (910 pixels) of luma samples being stored in memory 16, the next successive line of luma samples being stored in memory 18 and the next successive line being stored in memory 20. The stored lines of luma are replaced by new video lines as they are received on a cyclical basis.

Figure 4:
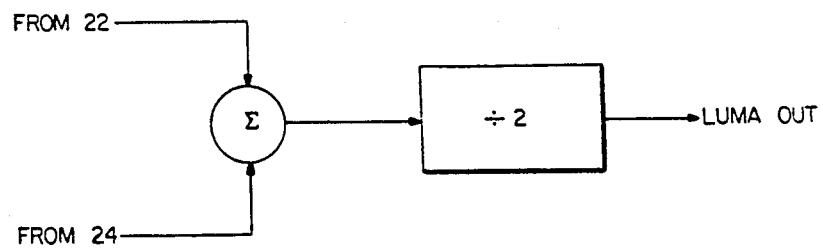
FIG. 4 is a simple combining circuit for providing an interpolated video line.

It will be appreciated that the time duration of each video line is reduced by 50% between the inputs and the outputs of memories 16–20. The outputs of the memories are supplied to an upper multiplexer 22 and to a lower multiplexer 24, each of which has a two bit select input that is supplied by timing and control circuit 14. The multiplexer outputs are coupled to a luma interpolator 26 which provides eight digital bit output real and interpolated luma signals. As is shown in FIG. 4, a basic form of interpolator 26 may consist of a simple adder and a divide-by-two arrangement coupled to upper multiplexer 22 and lower multiplexer 24. A microprocessor 17 supplies a K factor to timing diagram and control 14, for purposes to be explained.

Figure 3:
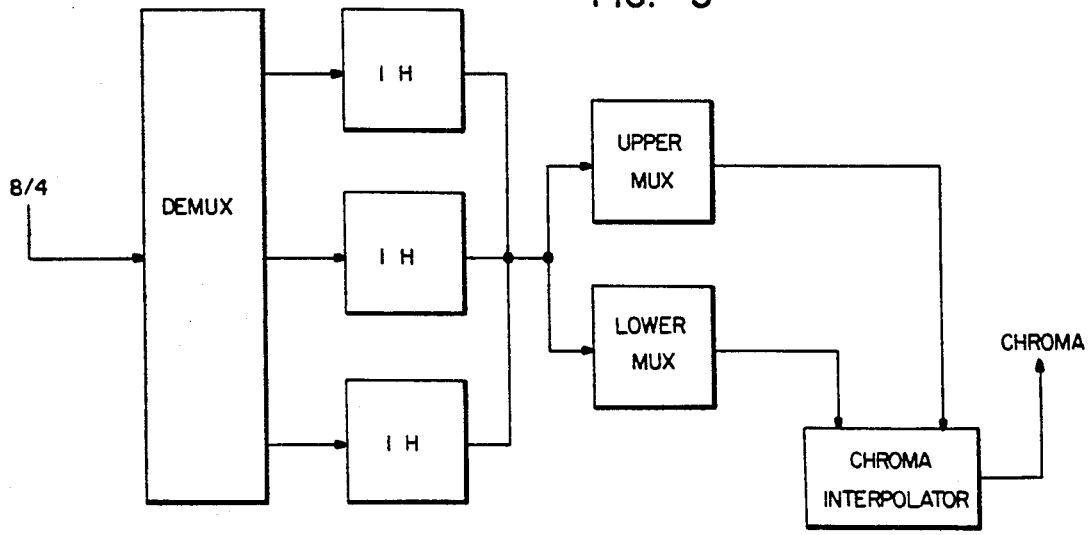
FIG. 3 is a simplified color signal version of the FIG. 2 arrangement.

The line doubler and chroma interpolator circuit of FIG. 3 is generally the same as the line doubler and luma interpolator circuit of FIG. 2. The chroma circuit is for a 4:2:2 digital video system which means that for every four samples of luma, there are two samples of (R-Y) chroma and two samples of (B-Y) chroma. In a 4:1:1 system, for every four samples of luma, there will be only one sample of (R-Y) chroma and one sample of (B-Y) chroma, with the length of each one line memory being correspondingly reduced from 910 to 455 pixels. Only the basic aspects of the circuit block diagram have been shown for simplicity.

Figure 5:
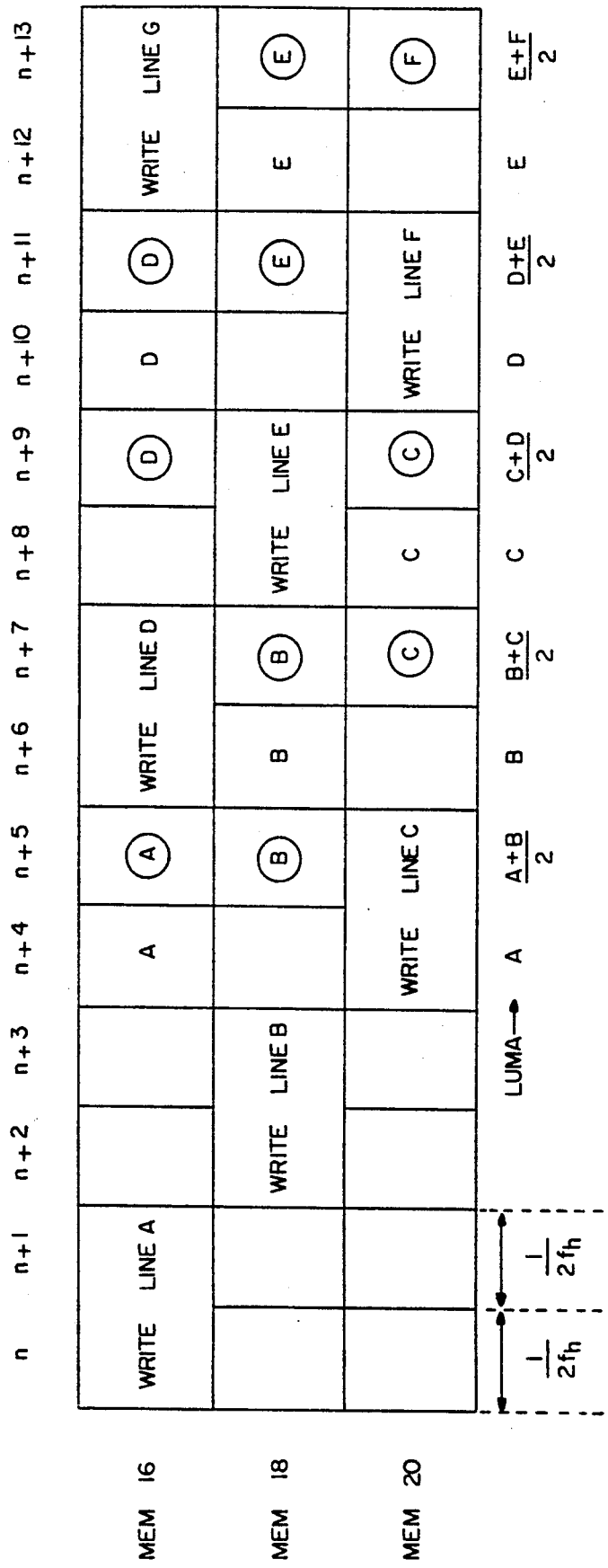
FIG. 5 is a chart illustrating the development of a resultant video format with alternate real and interpolated video lines.

Operation of the circuit of FIG. 2 is best explained in conjunction with the chart of FIG. 5 in which the three memories 16, 18 and 20 are represented horizontally and arbitrarily designated periods n, n+1, n+2...n+13 are represented vertically. It will be appreciated that each of the arbitrary periods is equal to one-half of the time required to scan a horizontal line or a period of ½H. In operation, assume that three successive lines A, B and C of real video have been stored in the three memories 16, 18 and 20, respectively. In the chart, line A is indicated as having been written into memory 16 during interval n and interval n+1. This is done at a 4 fc rate as previously discussed. Line B is written into memory 18 during the subsequent ½ H intervals n+2 and n+3 and line C is written into memory 20 during intervals n+4 and n+5. During interval n+4, line A is read out of memory 16 at a rate of 8 fc and applied by multiplexers 22 and 24 to interpolator 26 which produces an output signal comprising real line A at a horizontal rate of 2 H. During interval n+5 lines A and B are coupled by multiplexers 22 and 24, respectively, to interpolator 26 which, in its simplest implementation, develops an interpolated output line comprising (A+B)/2. The circles about letters A and B in interval n+5 indicate that an interpolated line is developed during this interval in response to real lines A and B.

Figure 6:
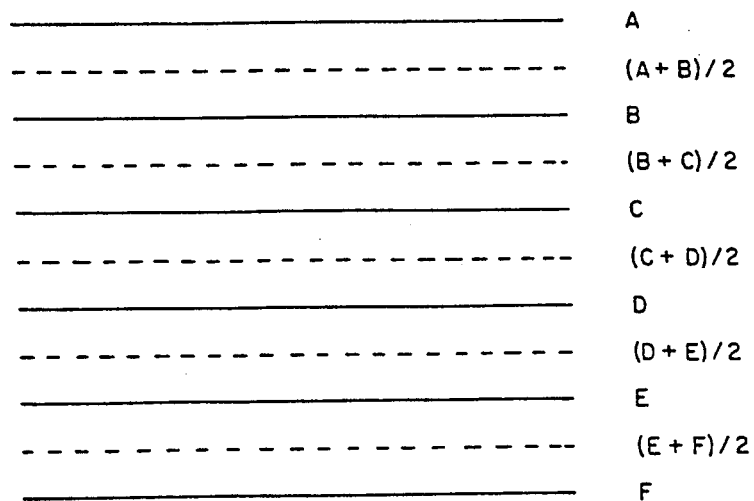
FIG. 6 illustrates the format of real and interpolated video lines developed in accordance with the chart of FIG. 5.

During the next interval n+6 writing of the next successive video line D into memory 16 begins (replacing line A) and line B is coupled from memory 18 by multiplexers 22 and 24 to interpolator 26 to provide an output comprising real line B. During interval n+7 writing of line D into memory 16 is completed. Lines B and C are read from memories 18 and 20, respectively, and interpolated to provide an interpolated line (B+C)/2. In interval n+8 writing of line E into memory 18 begins and real line C is provided as the output. In interval n+9 writing of line E is completed and the output from interpolator 26 is interpolated line (C+D)/2. The sequence continues as illustrated in the chart to provide a video field as shown in FIG. 6 where solid lines represent real video lines and dashed lines represent interpolated video lines.

Figure 7:
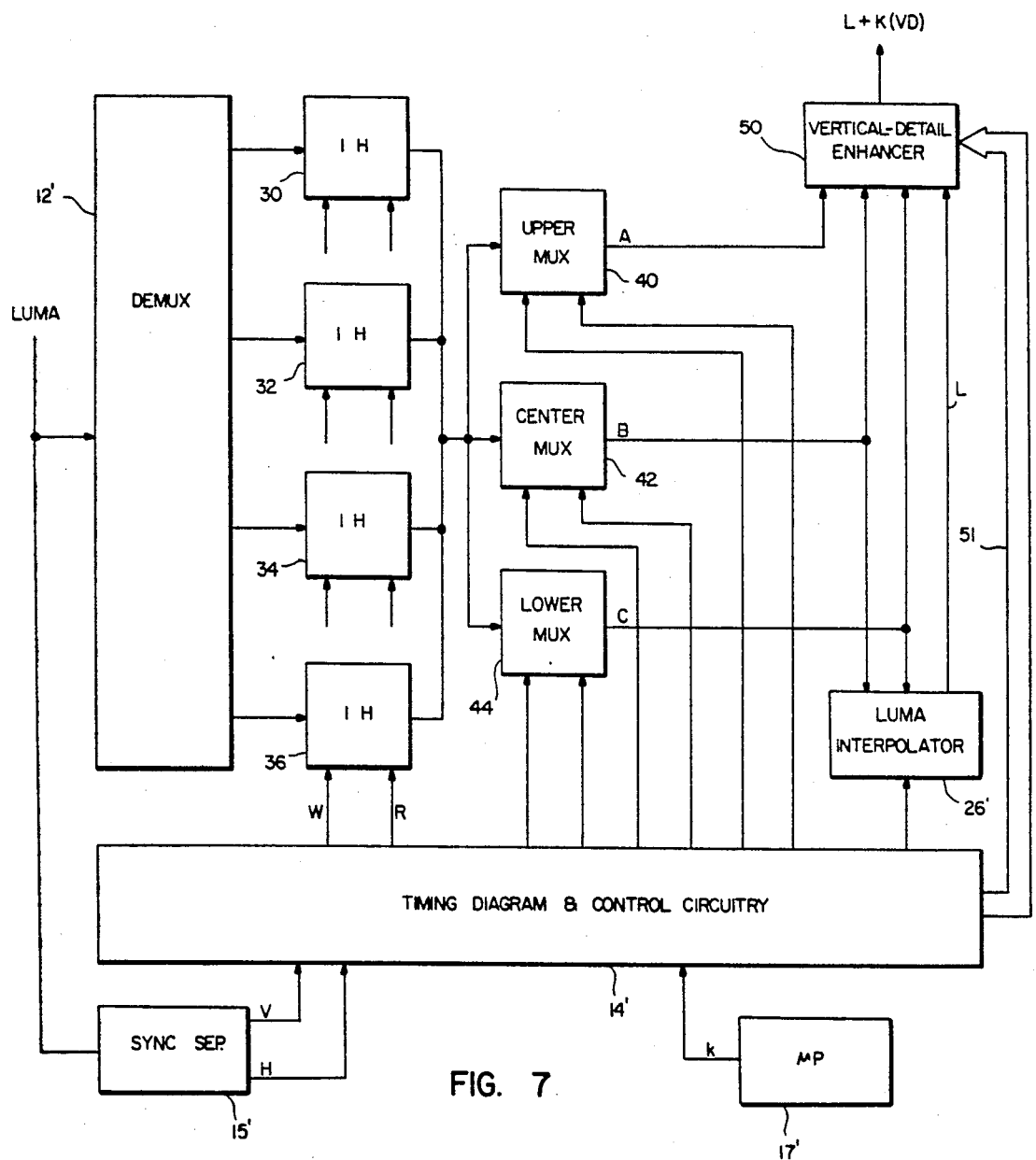
FIG. 7 is a block diagram of a video line doubler and video interpolator system with vertical detail enhancement.

In the FIG. 7 embodiment the demultiplexer 12' supplies a series of four 1 H line memories 30, 32, 34 and 36, respectively, which are coupled to an upper multiplexer 40, a center multiplexer 42 and a lower multiplexer 44. The outputs of center multiplexer 42 and lower multiplexer 44 are coupled to luma interpolator 26 and to a vertical detail enhancer 50. Upper multiplexer 40 is also coupled directly to vertical detail enhancer 50. Luma interpolator 26 supplies luma signal (L) to vertical detail enhancer 50. The output of vertical detail enhancer 50 consists of luma signal L plus a vertical detail component VD multiplied by a constant K. Luma signal L consists of real video lines and interpolated video lines, but the vertical detail component, as will be seen, is formed only with reference to the real video lines.

Figures 8A, 8B:
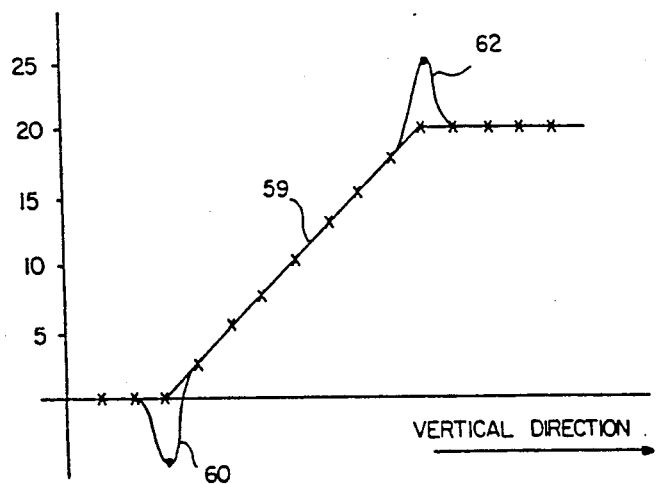
FIGS. 8A and 8B illustrates vertical enhancement.

Interpolator 26 may be the same as that illustrated for FIG. 2 and receives inputs from multiplexer 42 and 44. The luma output signal L from interpolator 26' is supplied with the multiplexer 40, 42 and 44 outputs applied to the vertical detail enhancer 50 to develop a vertically enhanced luma output. A bus 51 couples timing and control 14' to enhancer 50. The bus carries data specifying the real lines and the interpolated lines and brings K to zero for interpolated lines in the preferred arrangement of the invention, where vertical detail enhancement is effected only for real lines and not for interpolated lines. Thus, if the three successive real lines are "u", "m" and "l" (upper, middle and lower), enhancer 50 generates a vertical detail signal $VD = 2m - (u+l)$. The signal is multiplied by a programmable constant K, supplied from microprocessor 17 and added to the luma signal L from the interpolator to provide the output $K(VD)+L$. This effect is shown is FIGS. 8A and 8B which illustrate a succession of real and interpolated video lines, creating a video waveform 59. The luma values selected are arbitrary to illustrate the enhancement technique. The vertical detail component VD is calculated and added to the luminance signal L to provide enhancement in the form of an equal undershoot 60 and overshoot 62 to waveform 59.

Figure 9:
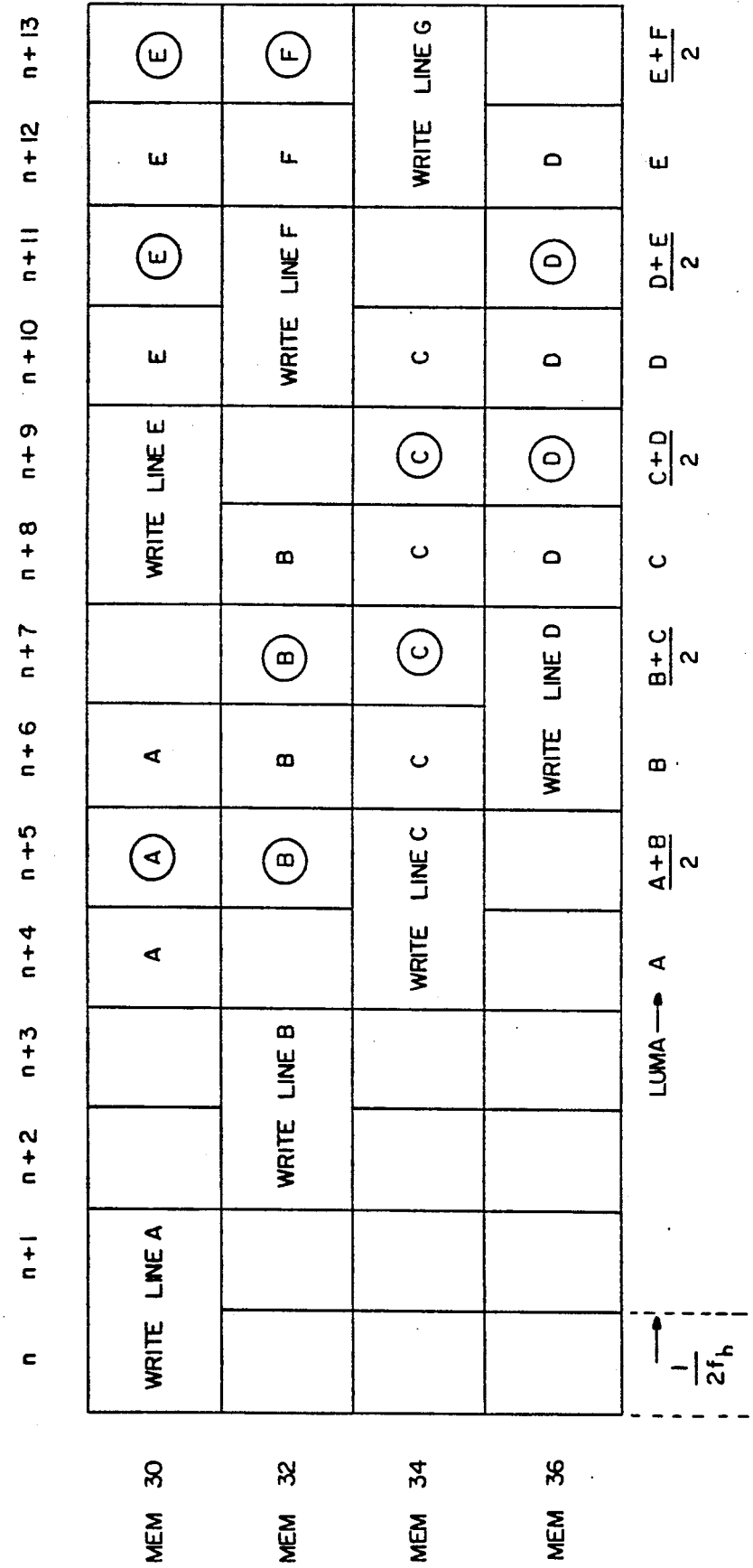
FIG. 9 is a chart similar to FIG. 5 showing development of the video format with vertical detail enhancement.

The chart of FIG. 9 illustrates operation of the circuit of FIG. 7. Successive video lines are written into memories 30, 32, 34 and 36 at a rate of 4 fc. Pixel data samples are read from the memories at twice the rate that they are written to the memories, namely at 8 fc. As explained in connection with FIG. 5, at interval n+4, real lines A and B have been written into memories 30 and 32, respectively, and the writing of real line C into memory 34 has begun. Also, during the interval n+4 real line A is being read out of memory 30 to form a display luma line. During the next interval n+5 an interpolated line is formed by averaging the real lines A and B stored in memories 30 and 32, respectively. Commencing with interval n+6, three successive lines of luma are stored and available for processing. This enables symmetrical vertical detail enhancement to be performed. (Symmetrical refers to the fact that lines preceding and subsequent to the line being processed are available and that the undershoots and overshoots are equalized.) Non symmetrical enhancement may be performed by only using two lines, and while having some effect, is not as effective as the preferred asymmetrical technique. In each interval following interval n+5, the outputs of multiplexers 42 and 44, which are coupled to interpolator 26, develop a real or interpolated line at its output. The outputs of all three multiplexers 40, 42 and 44 are coupled to vertical detail enhancer 50 to develop a vertical detail component VD for each real line based upon the above-mentioned relationship of $VD = 2m - (u + l)$ where m is the pixel value taken from the center line of a group of three successive real lines and u and l are pixel values from the upper and lower lines, respectively. Component VD is multiplied by a programmable factor K and added to the luma signal L from interpolator 26 to form the output luma signal L+K(VD). It should be noted that for interpolated lines, that is intervals n+7, n+9, etc. no vertical detail enhancement is performed (K=0). For the real lines, pixels from the real line immediately above and immediately below are used to derive vertical detail component VD. Thus line n+7 is simply the interpolated value (B+C)/2. However for line n+8, the center pixel is the original value of line C and the pixels from original lines B and D, respectively, above and below line C, are utilized to form vertical detail component VD which is added to the luma signal from interpolator 26 to derive the output luma signal, $C + K[2C - (B + D)]$.

It is thus seen that with the invention, not only are the deficiencies of the interlaced two field system overcome, but vertical detail enhancement is provided for benefitting the resultant video display.

It is recognized that numerous changes in the described embodiment of the invention will be apparent to those skilled in the art without departing from its true spirit and scope. The invention is to be limited only as defined in the claims.

What is claimed is:

1. A method of operating an interlaced video scanning system comprising the steps of:
    writing successive lines of real video information into memory at a line frequency rate 1 H;
    reading stored video information from said memory at a line frequency rate 2 H;
    developing interpolated lines of video information based upon real video information from immediately adjacent lines;
    processing successive ones of said lines of real video information with a vertical detail component developed according to the relationship $K[2m - (u + l)]$, where m, u and l are successive video upper, middle and lower lines and K is a constant, to enhance vertical detail; and
    making the enhanced real video lines and the interpolated video lines available for display at a line frequency rate 2 H.

2. A scanning system having two interlaced fields of horizontal lines comprising:
    first multiplexer means;
    memory means;
    means for writing successive lines of real video pixel information to said memory means at an H rate under sampling control of said first multiplexer means;
    second multiplexer means for reading out said real video pixel information from said memory means at a 2 H rate;
    interpolation means for combining said real video pixel information from said memory means to produce interpolated lines of video pixel information intermediate said real lines;
    means for vertically enhancing transients occurring among successive lines of said real video pixel information; and
    means for producing video data for display in a format of alternating lines of real and interpolated video pixel information.

3. The system of claim 2 wherein said interpolation means comprises means for averaging corresponding pixels in successive lines of real video pixel information.

4. The system of claim 3 wherein said means for vertically enhancing operates to develop a vertical detail signal according to the relationship $K[2m - (u + l)]$, where m, u and l are successive real video pixel upper, middle and lower lines and K is a constant.

5. In combination:
    first multiplexer means for receiving video information in the form of a series of pixels at a 1 H line frequency;
    line memory means coupled to said first multiplexer means for storing successive lines of real video pixel information;
    second multiplexer means coupled to said line memory means for reading out real video pixel information therefrom at a 2 H line frequency;
    interpolation means coupled to said second multiplexer means for developing lines of interpolated video pixels at a 2 H line frequency by combining immediately adjacent lines of real video pixel information; and
    vertical detail enhancement means for processing successive groups of lines of real video pixel information to enhance transitions therebetween, said vertical detail enhancement means developing a vertical detail component VD based upon the relationship $K[2m - (u + l)]$, where m, u and l are successive real video pixel upper, middle and lower lines and K is a constant.

6. The combination of claim 5 wherein said first multiplexer means samples said pixels at a first rate and said second multiplexer means reads out pixel information from said memory means at twice said first rate.

7. The combination of claim 6 in a color television receiver having a color subcarrier frequency fc and wherein said first rate is equal to 4 fc.

8. A method of operating an interlaced video scanning system comprising the steps of:
    writing successive lines of real video information into memory at a line frequency rate 1 H;
    reading stored video information from said memory at a line frequency rate 2 H;
    developing interpolated lines of video information based upon real video information from immediately adjacent lines;
    processing successive ones of said lines of real video information only to enhance vertical detail therein by developing a detail component according to the relationship $K[2m - (u + l)]$, where m, u and l are successive real video upper, middle and lower lines and K is a constant and using the detail component to enhance said real video lines; and
    making both said enhanced real video lines and said interpolated video lines available for display at a line frequency rate 2 H.

* * * * *